United States Patent
Tsujiuchi et al.

(10) Patent No.: US 9,084,961 B2
(45) Date of Patent: Jul. 21, 2015

(54) GAS-LIQUID CONTACTING PLATE, GAS-LIQUID CONTACTING LAMINATED BLOCK BODY, GAS-LIQUID CONTACTING LAMINATED STRUCTURE AND GAS PURIFICATION DEVICE

(75) Inventors: Tatsuya Tsujiuchi, Tokyo (JP); Hiromitsu Nagayasu, Tokyo (JP); Hiroshi Tanaka, Tokyo (JP); Takuya Hirata, Tokyo (JP); Keiji Fujikawa, Tokyo (JP); Ryuji Yoshiyama, Tokyo (JP); Yuichiro Sato, Tokyo (JP); Toyoshi Nakagawa, Tokyo (JP); Tsuyoshi Oishi, Tokyo (JP); Motomichi Ochiai, Kanagawa (JP); Kei Shioya, Kanagawa (JP); Shunji Ichikawa, Kanagawa (JP); Akihiro Kojima, Kanagawa (JP)

(73) Assignees: MITSUBISHI HEAVY INDUSTRIES, LTD., Tokyo (JP); KABUSHIKI KAISHA MEIJI GOMU KASEI, Tokyo (JP)

( * ) Notice: Subject to any disclaimer, the term of this patent is extended or adjusted under 35 U.S.C. 154(b) by 254 days.

(21) Appl. No.: 13/813,359
(22) PCT Filed: Dec. 8, 2011
(86) PCT No.: PCT/JP2011/078397
§ 371 (c)(1), (2), (4) Date: Jan. 30, 2013
(87) PCT Pub. No.: WO2012/077747
PCT Pub. Date: Jun. 14, 2012

(65) Prior Publication Data
US 2013/0127075 A1 May 23, 2013

(30) Foreign Application Priority Data
Dec. 9, 2010 (JP) ................................ 2010-275119

(51) Int. Cl.
B01D 53/18 (2006.01)
B01F 3/04 (2006.01)
(Continued)

(52) U.S. Cl.
CPC ........ *B01D 53/18* (2013.01); *B01D 3/28* (2013.01); *B01D 53/1406* (2013.01);
(Continued)

(58) Field of Classification Search
CPC ....... B01F 3/04; B01F 3/04078; B01D 53/14; B01D 53/1406; B01D 53/18; B01D 53/185
USPC ........................... 261/108, 110, 112.1, 112.2
See application file for complete search history.

(56) References Cited

U.S. PATENT DOCUMENTS 2,042,127 A * 5/1936 Sharrock .................... 261/112.1
2,986,379 A * 5/1961 Kramig ........................... 261/28
(Continued)

FOREIGN PATENT DOCUMENTS

CN 1103005 A 5/1995
CN 1276253 A 12/2000
(Continued)

OTHER PUBLICATIONS

Chinese Office Action dated Mar. 26, 2014, issued in corresponding Chinese Patent Application No. 201180040378.9 with English translation (22 pages).
(Continued)

*Primary Examiner* — Robert A Hopkins
(74) *Attorney, Agent, or Firm* — Westerman, Hattori, Daniels & Adrian, LLP

(57) ABSTRACT

A gas-liquid contacting plate of the present invention in which a treatment liquid flows from an upper side to a lower side direction of a substrate and a part of gas being in contact with the treatment liquid is absorbed into the treatment liquid, includes a downward protruding saw teeth-shaped portion in which a lower end side of the substrate has pitches at predetermined gaps. Further, a pore group for liquid dispersion having a predetermined gap is provided in a plurality of lines, in the substrate. An arrangement thereof is a zigzag arrangement.

11 Claims, 15 Drawing Sheets

(51) Int. Cl.
  *B01D 53/14* (2006.01)
  *B01J 19/32* (2006.01)
  *B01D 3/28* (2006.01)

(52) U.S. Cl.
  CPC ......... *B01D 53/185* (2013.01); *B01F 3/04078* (2013.01); *B01J 19/32* (2013.01); *B01D 2257/204* (2013.01); *B01D 2257/406* (2013.01); *B01D 2257/504* (2013.01); *B01J 2219/32206* (2013.01); *B01J 2219/32227* (2013.01); *B01J 2219/32241* (2013.01); *B01J 2219/32244* (2013.01); *B01J 2219/32251* (2013.01); *B01J 2219/32258* (2013.01); *B01J 2219/32262* (2013.01); *B01J 2219/32272* (2013.01); *B01J 2219/32483* (2013.01); *B01J 2219/3325* (2013.01)

(56) References Cited

U.S. PATENT DOCUMENTS

| | | |
|---|---|---|
| 6,436,245 B1 | 8/2002 | Nishimura et al. |
| 2004/0228777 A1 | 11/2004 | Mimura et al. |
| 2007/0187849 A1 | 8/2007 | Okada et al. |

FOREIGN PATENT DOCUMENTS

| | | | |
|---|---|---|---|
| DE | 101 62 457 A1 | | 7/2003 |
| JP | 53-58485 A | | 5/1978 |
| JP | 54-17370 A | | 2/1979 |
| JP | 54-48681 A | | 4/1979 |
| JP | 58-54608 B2 | | 12/1983 |
| JP | 60-1421 U | | 1/1985 |
| JP | 2003-170041 A | | 6/2003 |
| JP | 2003-340268 A | | 12/2003 |
| JP | 2003340268 A | * | 12/2003 |
| JP | 3854538 B2 | | 12/2006 |

OTHER PUBLICATIONS

International Search Report for PCT/JP2011/078397, mailing date of Jan. 17, 2012.
Written Opinion for PCT/JP2011/078397, mailing date of Jan. 17, 2012 (Non-English).
Written Opinion of PCT/JP2011/078397, mailing date of Jan. 17, 2012.
German Office Action dated Nov. 18, 2014, issued in German Patent Application No. 11 2011 104 316.3, w/ English translation (12 pages).

* cited by examiner

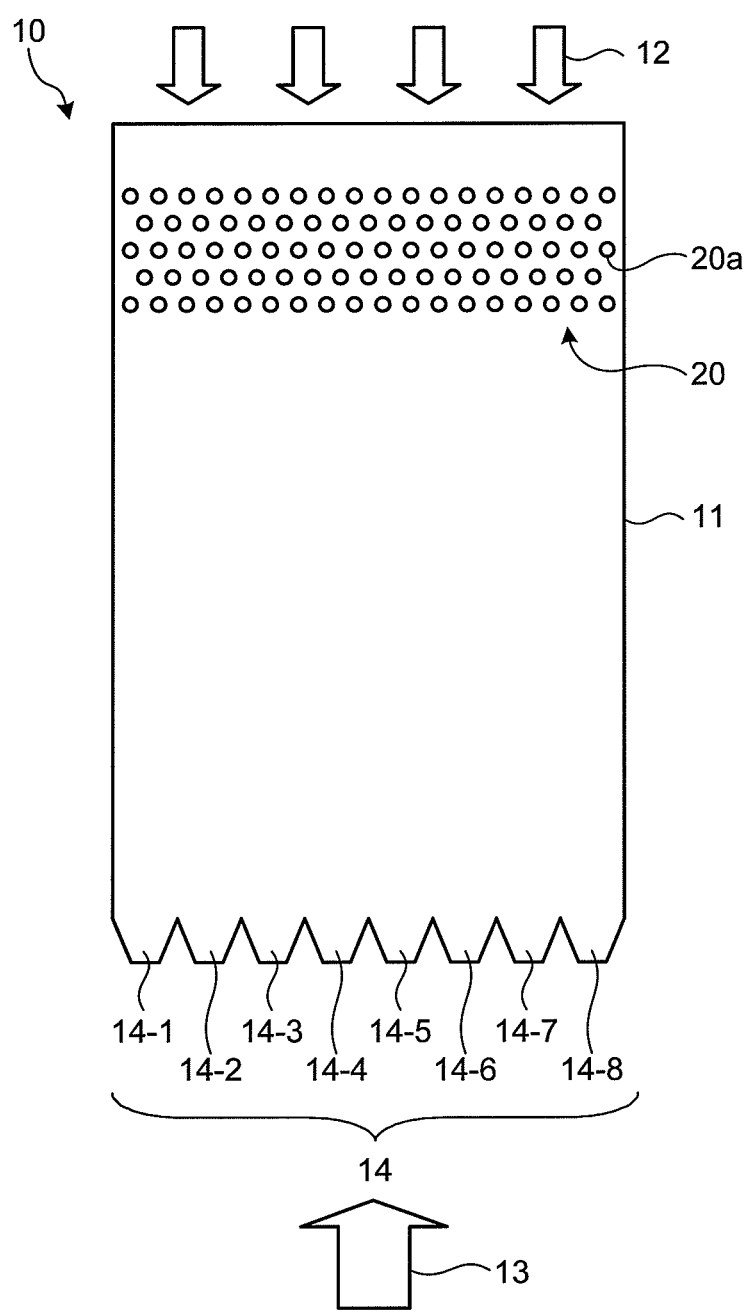

FIG.13

| DIMENSION | 1.5W × 1.0L × 0.3D | 0.75W × 0.5L × 0.3D | 0.5W × 0.3L × 0.3D | ABOUT 0.3W × ABOUT 0.3L × ABOUT 0.1D |
|---|---|---|---|---|
| OUTLINE | SUBSTRATE 11; W=1.5 mm; 80 HORIZONTAL GROOVE D=0.3 mm; L=1.0 mm; PLATE THICKNESS 2 mm | 11; W=0.75 mm; 80; L=0.5 mm; PLATE THICKNESS 2 mm | W=0.5 mm; 11; 80; L=0.3 mm; PLATE THICKNESS 2 mm | W=0.3 mm; 11; 80; D=0.1 mm; L=0.3 mm; PLATE THICKNESS 2 mm |
| JUDGEMENT | × | ○ | ◎ | × |

GAS-LIQUID CONTACTING PLATE, GAS-LIQUID CONTACTING LAMINATED BLOCK BODY, GAS-LIQUID CONTACTING LAMINATED STRUCTURE AND GAS PURIFICATION DEVICE

FIELD

The present invention relates to a gas-liquid contacting plate having excellent gas-liquid contact efficiency, a gas-liquid contacting laminated block body, a gas-liquid contacting laminated structure and a gas purification device.

BACKGROUND

As a device for absorbing harmful or helpful gas, a gas-liquid contacting device using an absorbent is known. In chemical plants, in order to increase the absorption efficiency of exhausted gas such as carbon dioxide ($CO_2$), for example, a cylindrical or rectangular absorber is mainly used and a gas-liquid contacting plate is disposed inside a tower to increase the contact area of gas and the absorbent. In general, it is known that gas-liquid contacting performance depends on the total surface area of liquid films. In order to obtain high gas-liquid contacting performance, it is preferable that liquid be widely spread out on the surface of the gas-liquid contacting plate as much as possible. The wide spread-out of liquid represents excellent wettability. As a material of the gas-liquid contacting plate, a metal material is mainly used.

Gas-liquid contacting plates are disposed inside a container of the absorber to spray the absorbent through nozzles. However, it is difficult for the absorbent to be evenly sprayed inside the container. In addition, it is difficult for wettability to be evenly distributed for all the surfaces of a plurality of the gas-liquid contacting plates, which is provided inside the container. In addition, when the gas-liquid contacting plate is made of metal, the total weight of a gas-liquid contacting tower increases and thus there is a problem in that the sizes of structural parts supporting the gas-liquid contacting tower increase.

On the other hand, as the material of the gas-liquid contacting plate instead of a metal, for example, a polymeric material such as resin may be considered. Though the polymeric material has a light weight, excellent workability performance, a chemical resistance property, and an inexpensive cost, most of the polymeric material used as industrial materials is hydrophobic, and thereby there is a problem in that it is difficult to obtain wettability described above.

In recent years, so-called hydrophilic polymers, which are polymeric materials and have hydrophilicity, have been known. When a hydrophilic polymer is used as a material of the gas-liquid contacting plate, the weight is light, workability is superior, and further, the above-described wettability is also easily obtained. However, there are problems in that the hydrophilic polymers are generally expensive compared to hydrophobic polymer materials and the moldability into a compact such as a film is low. In addition, it is known that the hydrophilic polymers have a problem in that they absorb moisture when being in contact with water and thus the strength thereof deteriorates, which is problematic.

Herein, the gas-liquid contacting plate having excellent workability, inexpensive cost and hydrophilicity at a bottom portion of a concave portion in which wettability is spread out in an width direction of the gas-liquid contacting plate is proposed (Patent Literature 1).

CITATION LIST

Patent Literature

Patent Literature 1: Japanese Patent Application Laid-Open No. 2003-340268

SUMMARY

Technical Problem

However, in the aforementioned proposal, there are problems in that performing hydrophilicity at a bottom portion of a concave portion is troublesome, hydrophilic treated products come away if an operation is performed over a long period and thus, wettability decreases.

The present invention has been made in consideration of these problems, and an object of the invention is to provide the gas-liquid contacting plate which has a simple configuration and superior wettability even in a case of performing the operation over a long period, the gas-liquid contacting laminated block body, the gas-liquid contacting laminated structure and the gas purification device.

Solution to Problem

According to a first aspect of the present inventions in order to solve the above problems, there is provided a gas-liquid contacting plate made of resin in which a treatment liquid flows from an upper side to a lower side direction of a substrate and a part of gas in contact with the treatment liquid is absorbed into the treatment liquid, the gas-liquid contacting plate including: a liquid dispersion structure in which a surface of the substrate is subjected to a hydrophilic treatment and a treatment liquid, which flows from the upper side, is dispersed on a gas-liquid contacting plate; and a liquid delivery structure which makes the treatment liquid uniformly flow down from the gas-liquid contacting plate.

According to a second aspect of the present inventions, there is provided the gas-liquid contacting plate according to the first aspect, wherein the gas-liquid contacting plate includes a liquid receiving structure which brings the treatment liquid, which flows down from the upper side, into contact with the gas-liquid contacting plate.

According to a third aspect of the present inventions, there is provided the gas-liquid contacting plate according to the first or second aspect, wherein in the liquid delivery structure, a lower end side of the substrate has a downward protruding saw teeth shape having pitches at predetermined gaps, and wherein the downward protruding saw teeth-shaped portion is formed of bilaterally symmetric inclined surface portions and a flat portion which is a top surface of inclined surface portions.

According to a fourth aspect of the present inventions, there is provided the gas-liquid contacting plate according to any one of the first to third aspects, wherein the liquid dispersion structure is formed of a plurality of lines of pore groups or protrusion groups at predetermined gaps, and wherein an arrangement of the pore groups or the protrusion groups is in a zigzag arrangement.

According to a fifth aspect of the present inventions, there is provided the gas-liquid contacting plate according to the fourth aspect, wherein the liquid receiving structure includes protruding liquid receiving groups arranged at predetermined gaps between the pore groups or the protrusion groups and an upper edge portion of the substrate.

According to a sixth aspect of the present inventions, there is provided the gas-liquid contacting plate according to the fifth aspect, wherein the liquid receiving group is formed of a plurality of cylinders or columns.

According to a seventh aspect of the present inventions, there is provided the gas-liquid contacting plate according to any one of the first to sixth aspects, wherein the surface of the substrate is a hydrophilic rough surface structure.

According to an eighth aspect of the present inventions, there is provided the gas-liquid contacting plate according to any one of the first to seventh aspects, wherein the substrate contains a hydrophilic material.

According to a ninth aspect of the present inventions, there is provided a gas-liquid contacting laminated block body, which is a laminated body in which the gas-liquid contacting plate according to any one of the first to eighth aspects is laminated in a direction perpendicular to a vertical axis direction.

According to a tenth aspect of the present inventions, there is provided a gas-liquid contacting laminated structure, wherein a plurality of lines of the gas-liquid contacting laminated block bodies according to the ninth aspect are alternately laminated by a phase of 90 degrees in a vertical axis direction.

According to an eleventh aspect of the present inventions, there is provided a gas-liquid contacting laminated structure according to the tenth aspect, wherein a gap between laminated gas-liquid contacting plates which form the gas-liquid contacting laminated block body is the same as a gap between peak portions of downward protruding saw teeth-shaped portion.

According to a twelfth aspect of the present inventions, there is provided a gas purification device, including: a gas purification device main body through which a gas circulates; the gas-liquid contacting laminated structure according to the tenth or eleventh aspect which is disposed inside the gas purification device main body; a gas introduction unit which introduces the gas from either of a bottom portion or upper portion of the gas purification device main body; a gas discharge unit which discharges the gas from a side different from the gas introduction unit side; a treatment liquid supply unit which supplies a treatment liquid from an upper side to the gas-liquid contacting laminated structure; and a treatment liquid discharge unit which is installed in the vicinity of the bottom portion of the gas purification device main body and discharges the treatment liquid.

Advantageous Effects of Invention

According to the present invention, a liquid dispersion structure which disperses a treatment liquid, which flows from an upper side, in a gas-liquid contacting plate; and a liquid delivery structure which makes the treatment liquid uniformly flow down from the gas-liquid contacting plate are provided, thereby improving dispersibility and a receiving and delivering property of liquid of the treatment liquid are improved.

BRIEF DESCRIPTION OF DRAWINGS

FIG. 1 is a schematic diagram of a gas-liquid contacting plate according to an example.

FIG. 2-1 is a diagram illustrating the respective peak portions (1 mm) of downward protruding saw teeth-shaped portions.

FIG. 2-2 is a diagram illustrating the respective peak portions (3 mm) of downward protruding saw teeth-shaped portions.

FIG. 5-1 is a pattern diagram illustrating a liquid reception and delivery according to the example.

FIG. 5-2 is a pattern diagram illustrating a liquid reception and delivery according to a comparative example.

FIG. 6-1 is a front view illustrating a liquid receiving portion and a liquid dispersing portion according to the example.

FIG. 6-2 is a side view illustrating a liquid receiving portion and a liquid dispersing portion according to the example.

FIG. 8-1 is a diagram illustrating an arrangement state of pores (two-line zigzag arrangement), which forms a pore group according to the example.

FIG. 8-2 is a diagram illustrating the arrangement state of pores (three-line zigzag arrangement), which forms a pore group according to the example.

FIG. 8-3 is a diagram illustrating the arrangement state of pores (four-line zigzag arrangement), which forms a pore group according to the example.

FIG. 9-1 is a schematic diagram of a substrate in which pores (pore diameter of 5 mm) that form a pore group are disposed in a two-line zigzag arrangement according to the example.

FIG. 9-2 is a schematic diagram of the substrate in which pores (pore diameter of 5 mm) that form a pore group are disposed in a three-line zigzag arrangement according to the example.

FIG. 9-3 is a schematic diagram of the substrate in which pores (pore diameter of 5 mm) that form a pore group are disposed in a two-line zigzag arrangement according to the example.

FIG. 9-4 is a schematic diagram of the substrate in which pores (pore diameter of 5 mm) that form a pore group are disposed in a three-line zigzag arrangement according to the example.

FIG. 9-5 is a schematic diagram of the substrate in which pores (pore diameter of 3 mm) that form a pore group are disposed in a four-line zigzag arrangement according to the comparative example.

FIG. 9-6 is a schematic diagram of the substrate in which pores (pore diameter of 4 mm) that form a pore group are disposed in a four-line zigzag arrangement according to the comparative example.

FIG. 9-7 is a schematic diagram of the substrate in which pores (pore diameter of 5 mm) that form a pore group are disposed in a four-line zigzag arrangement according to the example.

FIG. 9-8 is a schematic diagram of the substrate in which pores (pore diameter of 4 mm) that form a pore group are disposed in a three-line zigzag arrangement according to the example.

FIG. 13 is a diagram in which horizontal grooves are formed on the substrate according to the example.

DESCRIPTION OF EMBODIMENTS

Hereinafter, an example of the present invention will be described in detail with reference to the drawings. However, the present invention is not limited to the example. In addition, constituents of the example described below include one easily assumed by those skilled in the related art or substantially the same one.

EXAMPLES

Figures 1, 2:
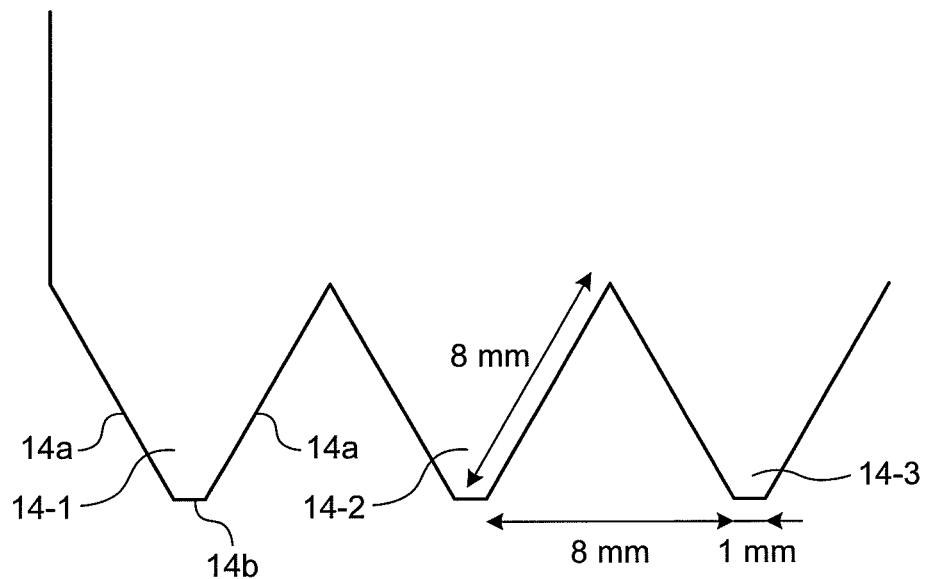
Figure 2:
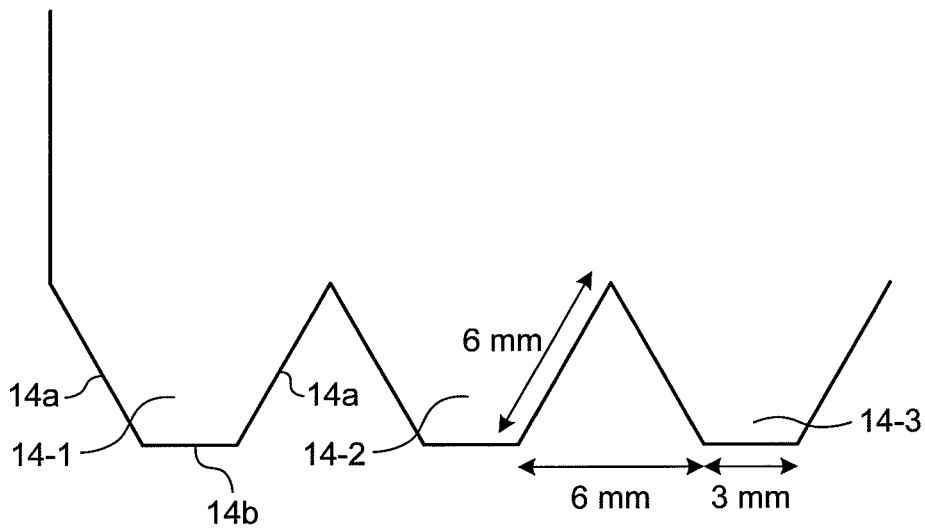

A gas-liquid contacting plate according to the example of the present invention will be described with reference to the drawings. FIG. 1 is a schematic diagram of the gas-liquid contacting plate.

As illustrated in FIG. 1, in a gas-liquid contacting plate 10 in which a treatment liquid 12 flows from an upper side to a lower side direction of a substrate 11 and a part of gas 13 brought into contact with the treatment liquid 12 is absorbed into the treatment liquid 12, the gas-liquid contacting plate includes downward protruding saw teeth-shaped portions 14 in which a lower end side of the substrate 11 includes pitches at predetermined gaps.

FIG. 2-1 is a diagram illustrating the respective peak portions (1 mm) of the downward protruding saw teeth-shaped portions 14, and FIG. 2-2 is a diagram illustrating the respective peak portions (3 mm) of the downward protruding saw teeth-shaped portions 14.

As illustrated in FIGS. 2-1 and 2-2, the respective peak portions 14-1 to 14-8 of the downward protruding saw teeth-shaped portions 14 is formed of the respective bilaterally symmetric inclined surface portions (6 mm to 8 mm) 14a and a flat portion (1 mm to 3 mm) 14b which is a top surface of the inclined surface portions 14a.

As illustrated in FIG. 2-1, when a length of the inclined surface portion 14a is 8 mm, a length of the flat portion 14b becomes 1 mm. In addition, as illustrated in FIG. 2-2, when the length of the inclined surface portion 14a is 6 mm, the length of the flat portion 14b becomes 3 mm.

When the gas-liquid contacting plates 10 are laminated in plural lines, the downward protruding saw teeth-shaped portions 14 play a role of the liquid delivery structure which delivers the treatment liquid 12 flowing from the upper side of the substrate 11 to the subsequent gas-liquid contacting plate 10, as described below.

In addition, as illustrated in FIG. 1, a plurality of lines of the pore groups 20 for liquid dispersion is provided in the substrate 11 at predetermined gaps.

The plurality of lines of the pore group 20 for liquid dispersion is formed of a plurality of pores 20a and an arrangement of the pores 20a is a liquid delivery structure having a zigzag arrangement.

The pore 20a has a diameter of 4.5 mm to 6.0 mm.

The reason is that a dispersion effect is not favorably obtained in the pore having a diameter of 4 mm.

Figure 3:
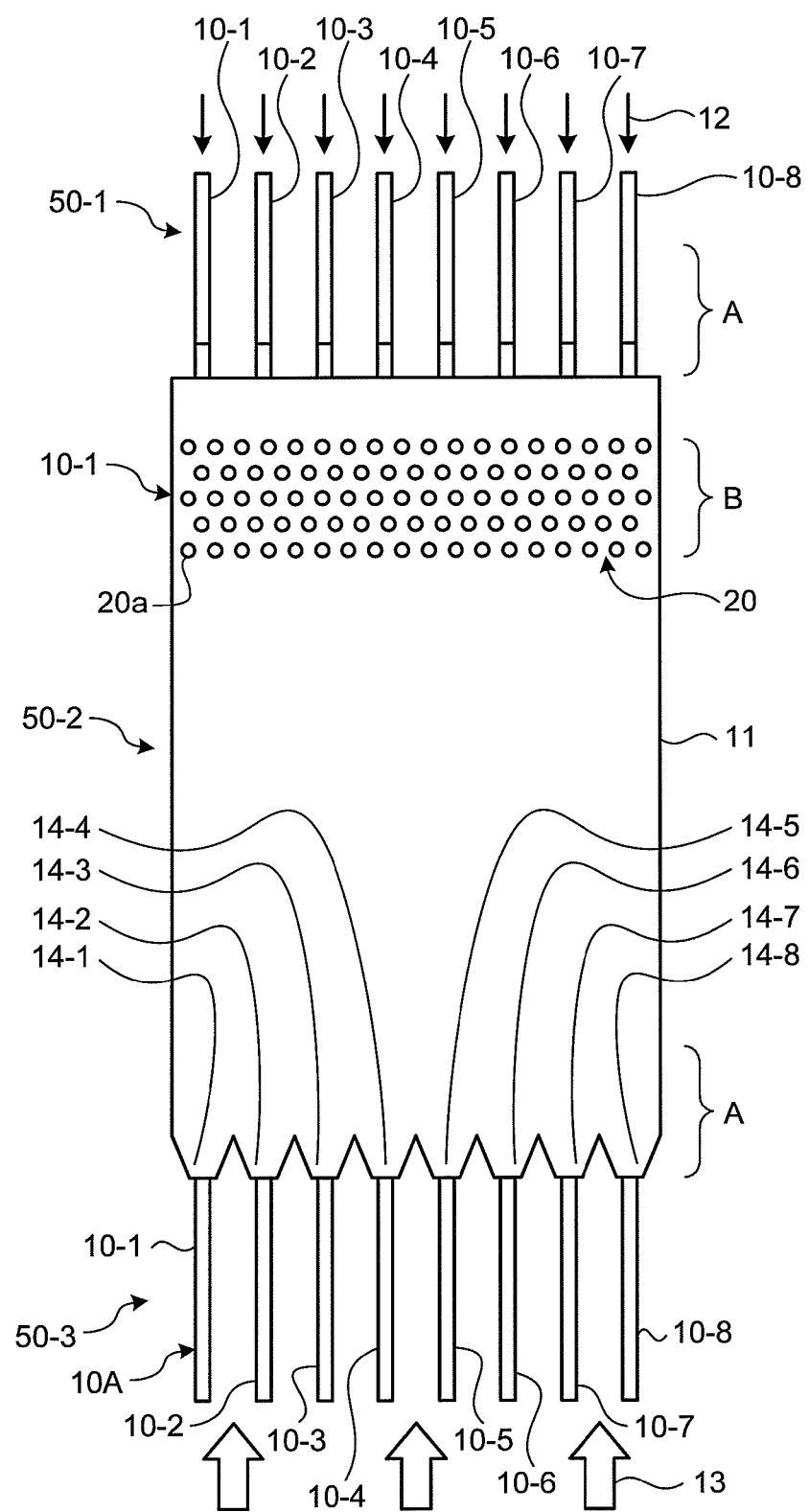
FIG. 3 is a schematic diagram illustrating a laminated state of a gas-liquid contacting laminated block body according to the example.

FIG. 3 is a schematic diagram illustrating a laminated state of a gas-liquid contacting laminated block body according to the example.

As illustrated in FIG. 3, the plurality of (in the present example, 8 sheets) gas-liquid contacting plates 10 illustrated in FIG. 1 are laminated at predetermined gaps to configure the gas-liquid contacting laminated block body 50, and the gas-liquid contacting laminated block bodies 50, are alternately laminated by a phase of 90 degrees with plural lines (three lines, 50-1 to 50-3).

By using the gas-liquid contacting laminated block body 50, the gas-liquid contacting laminated block bodies 50, are laminated with plural lines (three lines, 50-1 to 50-3) and filled up inside an absorber to perform a gas treatment, and make, for example, $CO_2$ contained in the gas 13 be absorbed into the treatment liquid 12.

Since the absorber configured by filling the gas-liquid contacting plate 10 is provided, for example, as a piece of equipment of chemical plants, and thus can be advantageously used as an absorber for purifying a water soluble gas component, such as carbon dioxide, a hydrogen halide, or ammonia contained in the gas generated in the inside of the chemical plant, by absorption with the treatment liquid such as water, or a deodorization system. Further, the absorber can also be used as a dissolving machine for obtaining a water solution, as a product, by dissolving these gas components in water.

Here, as an absorbent used for, absorption of carbon dioxide or the hydrogen halide as the treatment liquid 12, for example, the water solution of an amine-based compound such as monoethanolamine, diethanolamine, triethanolamine or the like is used. In addition, as the absorbent used for absorption of ammonia, water, the water solution of a diluted sulfuric acid or the like is used.

Figure 4:
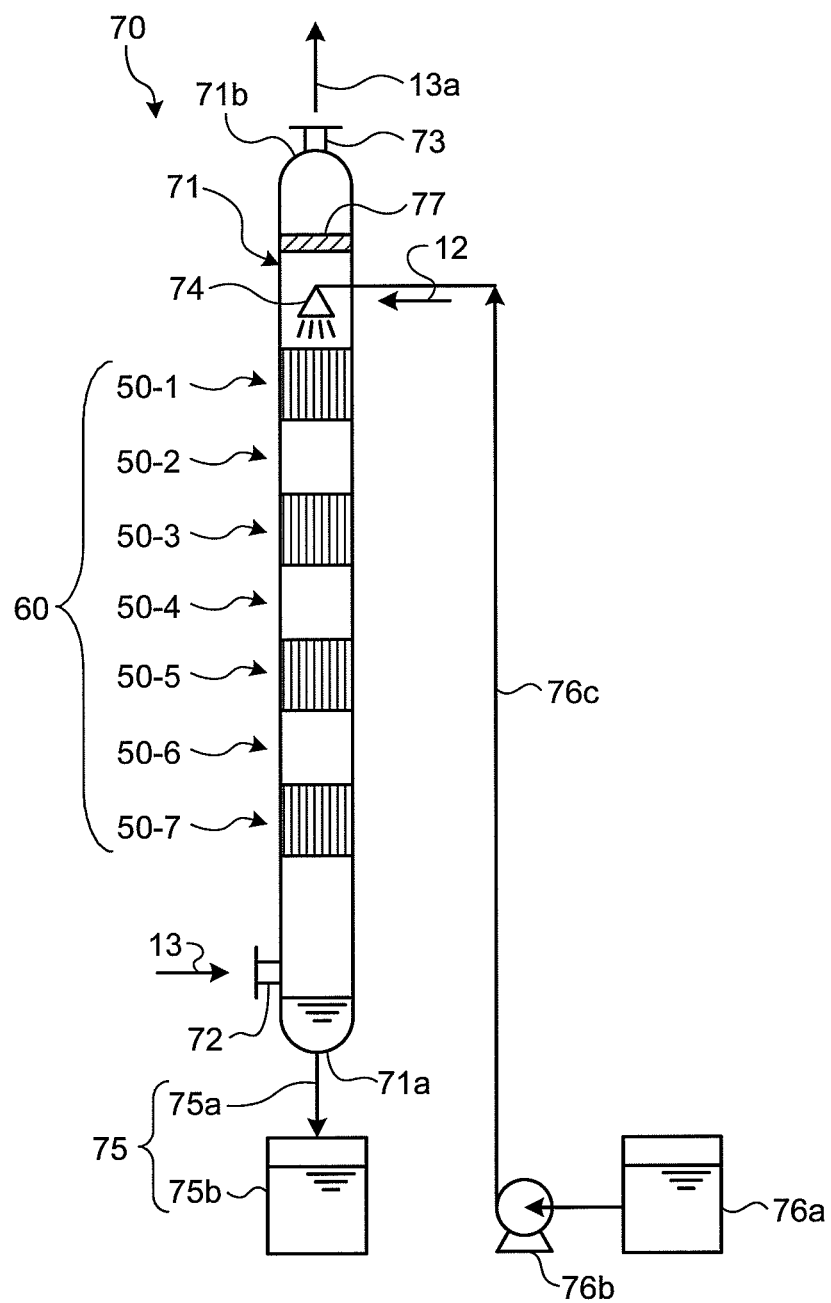
FIG. 4 is a schematic diagram illustrating a gas purification device.

FIG. 4 is a schematic diagram illustrating a gas purification device using the gas-liquid contacting laminated structure of the present invention. The inside of the absorber of the gas purification device has the gas-liquid contacting laminated structure in which the gas-liquid contacting laminated block bodies 50, are alternately provided by a phase of 90 degrees in plural lines (the present example, 50-1 to 50-7) in a vertical axis direction to perform a multistage treatment.

As illustrated in FIG. 4, the gas purification device 70 according to the present example includes a gas purification device main body 71 through which the gas 13 circulates, the gas-liquid contacting laminated structure 60 in which the gas-liquid contacting laminated block bodies 50 disposed in the gas purification device main body 71 are alternately provided by a phase of 90 degrees in plural lines (in the present example, 50-1 to 50-7) to perform a multistage treatment, a gas supply port 72 which is a gas introduction unit for introducing the gas 13 from any one of a bottom portions 71a (or upper portions 71b) of the gas purification device main body 71, a gas discharge port 73 which is a gas discharge unit for discharging a purification gas 13a from a side different from the installation side of the gas supply port 72, nozzles 74 which are a treatment liquid supply unit for supplying a treatment liquid 12 from an upper side of the gas-liquid contacting laminated structure 60, and a treatment liquid discharge unit (including a discharge line 75a and a used treatment liquid tank 75b) 75 for discharging the treatment liquid 12 provided in the vicinity of the bottom portion 71a of the gas purification device main body 71. Further, the treatment liquid 12 is introduced to the nozzles 74 through a treatment liquid tank 76a, a supply pump 76b and a supply line 76c. In addition, in the drawings, reference numeral 77 denotes a mist eliminator, which collects mist.

Further, the gas purification device may be used as a $CO_2$ absorber, an amine absorbent may be used as the treatment liquid 12, a regenerator for eliminating $CO_2$ from the treatment liquid absorbing $CO_2$ may be provided, a circulation line which circulates the amine absorbent may be provided, and then $CO_2$ in an exhaust gas that may be continuously treated.

The gas purification device 70 is provided with nozzles 74 spraying the treatment liquid 12 from the upper side, the gas 13 is introduced from a direction opposite to the treatment liquid 12 (or may be the same direction as the treatment liquid 12), and then gas-liquid contact with the treatment liquid 12 on the surface of the gas-liquid contacting plate 10 configuring the gas-liquid contacting laminated block body 50 is performed.

When laminated in a multistage manner, the gas-liquid contacting laminated block bodies 50 are not simply laminated in a multistage manner but are alternately laminated by a phase of 90 degrees, as illustrated in FIG. 3. According to this, a dropping of the treatment liquid 12, the liquid reception and delivery and the liquid dispersion are effectively performed.

Particularly, FIG. 3 illustrates a state where the gas-liquid contacting laminated block bodies 50 are laminated with three lines (50-1 to 50-3). First, in the gas-liquid contacting laminated block body 50-1 is a first line, the eight gas-liquid contacting plates 10-1 to 10-8 are laminated in a direction perpendicular to a paper surface. Further, in the gas-liquid contacting laminated block body 50-2 is a second line, the eight gas-liquid contacting plates are laminated in a direction parallel to the paper surface (in this drawing, among them, only one gas-liquid contacting plate 10-1 is illustrated). In addition, in the gas-liquid contacting laminated block body 50-3 in a third line, the eight gas-liquid contacting plates 10-1 to 10-8 are laminated in a direction perpendicular to the paper surface.

Then, the respective peak portions 14-1 to 14-8 of the downward protruding saw teeth-shaped portion 14, which have pitches at predetermined gaps and are formed below the gas-liquid contacting plate 10-1 of the gas-liquid contacting laminated block body 50-2 in the second line, are brought into contact with the eight gas-liquid contacting plates 10-1 to 10-8 of the gas-liquid contacting laminated block body 50-3 in the third line, respectively.

Figures 1, 5:
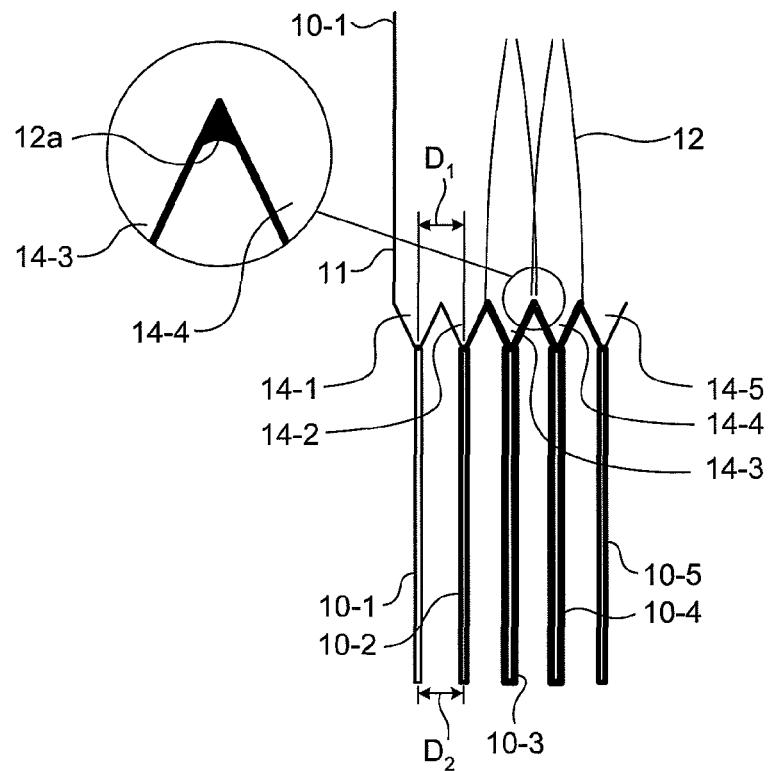
Figures 2, 5:
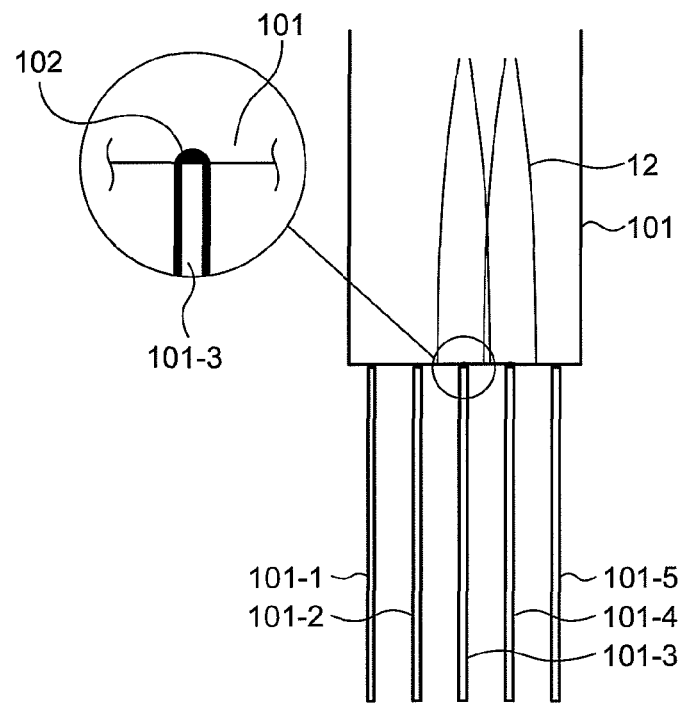

FIG. 5-1 is a pattern diagram illustrating a liquid receiving and delivering structure according to the example. FIG. 5-2 is a pattern diagram illustrating a liquid receiving and delivering structure according to a comparative example. In addition, FIG. 5-1 extracts a part from FIG. 3. Here, only two treatment liquids are in a flow down state.

As illustrated in FIG. 5-1, a gap $D_1$ between the respective peak portions 14-1 to 14-5 of the downward protruding saw teeth-shaped portions 14 is approximately the same as a laminated gap $D_2$ between the gas-liquid contacting plates 10-1 to 10-5, which form the gas-liquid contacting laminated block body 50-3 in the third line. In drawings, reference numeral 12a denotes a liquid film.

In addition, when an end portion of the related art is a linear gas-liquid contacting plate, as illustrated in FIG. 5-2, if the phase in a lower line is changed by 90 degrees, in each of the contact portions of a lower edge portion of the gas-liquid contacting plate 101-1 in the upper line side when the gas-liquid contacting plate is inclined and the gas-liquid contacting plates 101-1 to 101-5 in a lower line side, the dropping of the treatment liquid 12 is not uniformly performed. In drawings, reference numeral 102 denotes a state of a stagnant liquid.

On the other hand, according to the present invention, the respective peak portions 14-1 to 14-8 of the downward protruding saw teeth-shaped portions 14 are formed, thereby uniformly delivering the treatment liquid 12 to the gas-liquid contacting plates 101-1 to 101-5 in a lower line side.

That is, when the treatment liquid 12 is dropped from the gas-liquid contacting laminated block body 50-2 in the second line, since the saw teeth-shaped portion 14 is provided therein, the dropping of the liquid is performed by the peak portions 14-1 to 14-8. Further, since the gas-liquid contacting laminated block body 50-3 in the third line is provided by a phase of 90 degrees, the liquid is dropped on the gas-liquid contacting plates 10-1 to 10-8 corresponding to the peak portions 14-1 to 14-8 so as to reliably perform reception and delivery of the treatment liquid 12.

As described above, it is confirmed that a liquid of the treatment liquid 12 dropping from the gas-liquid contacting laminated block body 50-1 in the first line is reliably received and delivered by a liquid delivering portion A, and the treatment liquid 12 is spread out on all the surfaces of the substrate 11 by a liquid dispersing portion B, which is formed of the pore groups 20 for liquid dispersion arranged in plural lines as the liquid dispersing portion installed on the substrate. As a result, the gas-liquid contact efficiency of the treatment liquid 12 and the gas 13 are improved.

Therefore, since these processes are alternately performed, and as a result, the liquid dispersion efficiency is improved and thus the gas-liquid contact efficiency of the treatment liquid 12 and the gas 13 is improved.

Figures 1, 6:
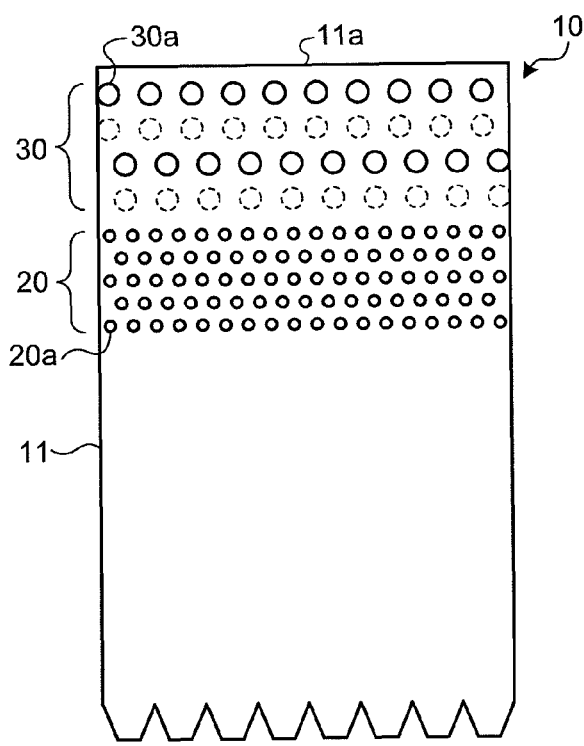
Figures 2, 6:
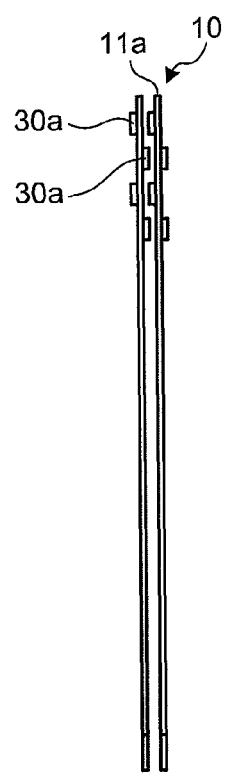

FIG. 6-1 is a front view illustrating a liquid receiving portion and a liquid dispersing portion according to the example. FIG. 6-2 is a side view thereof.

As illustrated in FIGS. 6-1 and 6-2, the protruding liquid receiving group 30 having predetermined gaps may be provided between the pore group 20 and the upper edge portion 11a of the substrate 11.

The protruding liquid receiving group 30 plays a role of the liquid receiver, which receives the treatment liquid 12 dropping from the upper side.

The liquid receiving group 30 is formed of a plurality of cylinders (or columns) 30a.

A diameter of the cylinder (or column) 30a is about 9 mm.

Therefore, as illustrated in FIGS. 6-1 and 6-2, since there are the plurality of cylinders 30a of the liquid receiving group 30, even in a case in which a position alignment of the peak portions is shifted, the dropped treatment liquid 12 is brought into contact with a side wall of the cylinder 30a, such that the treatment liquid may be guided to the substrate 11 side.

A solid column may be used instead of the cylinder 30a. The cylinder or column is integrally formed with the substrate. In addition, a hole is formed on the substrate and a pipe passes through the hole to form the liquid receiving group 30. At this time, a spacer is separately required.

Figure 7:
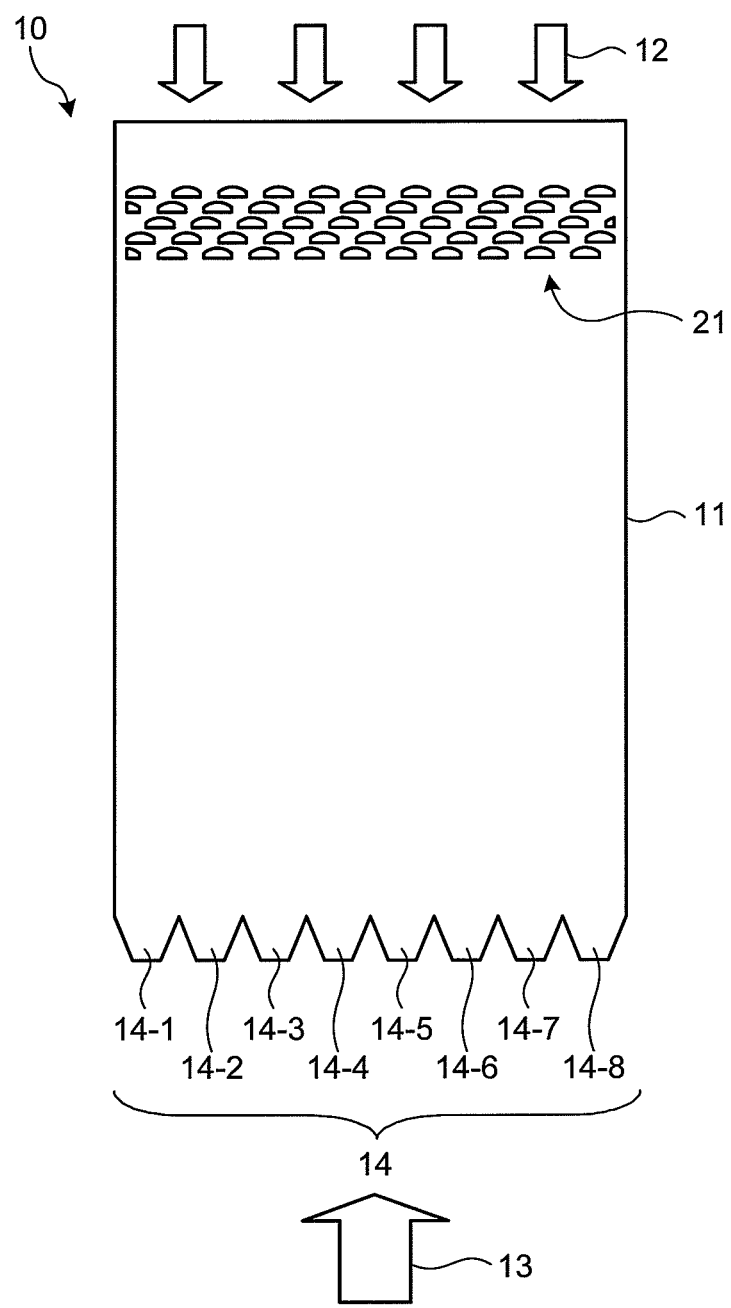
FIG. 7 is a schematic diagram of another gas-liquid contacting plate according to the example.

Further, as illustrated in FIG. 7, the gas-liquid contacting plate 10 according to another example includes protrusion groups 21 having predetermined gaps, and disposed on the substrate 11.

An arrangement of the protrusion groups 21 is also a zigzag arrangement.

The protrusion groups 21 plays a role of a dispersing portion for improving dispersibility of the treatment liquid 12, which flows on the substrate 11.

Figures 1, 8:
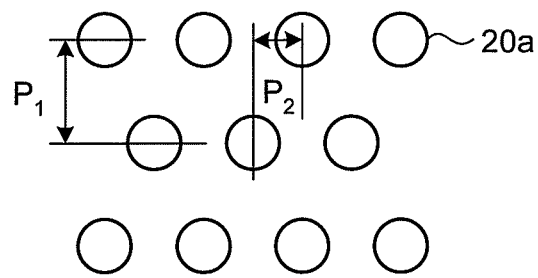
Figures 2, 8:
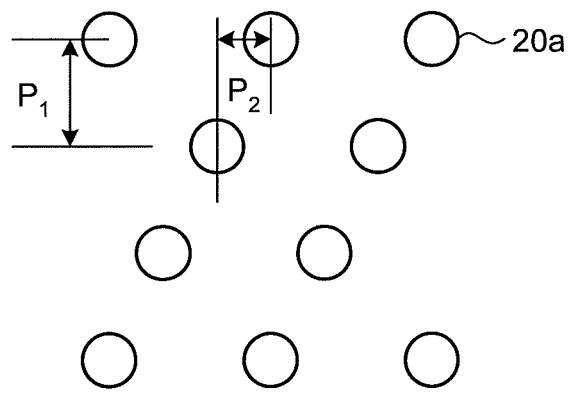
Figures 3, 8:
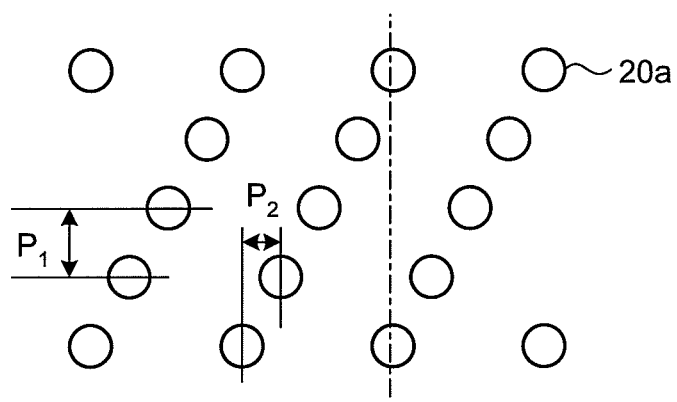

FIGS. 8-1 to 8-3 are examples of the zigzag arrangements of the pore groups.

FIG. 8-1 is a diagram illustrating an arrangement state of pores (two-line zigzag arrangement), which forms a pore group according to the example. FIG. 8-2 is a diagram illustrating the arrangement state of pores (three-line zigzag arrangement), which forms a pore group according to the example. FIG. 8-3 is a diagram illustrating the arrangement state of pores (four-line zigzag arrangement), which forms a pore group according to the example.

Figures 1, 9:
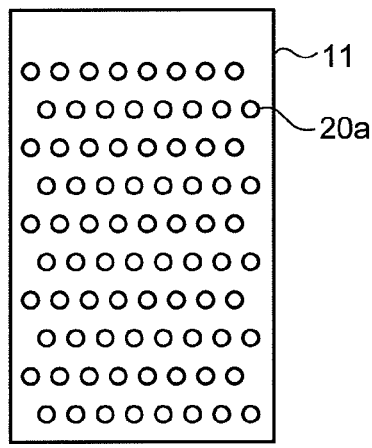
Figures 2, 9:
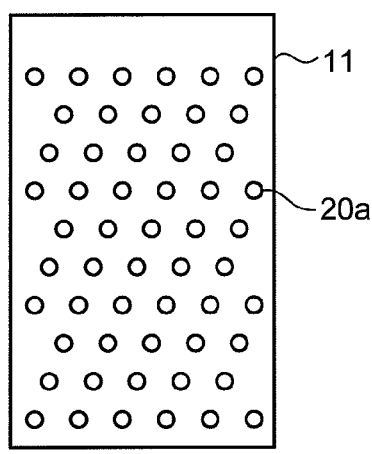
Figures 3, 9:
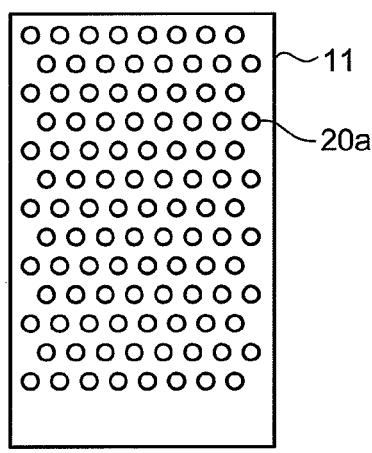
Figures 4, 9:
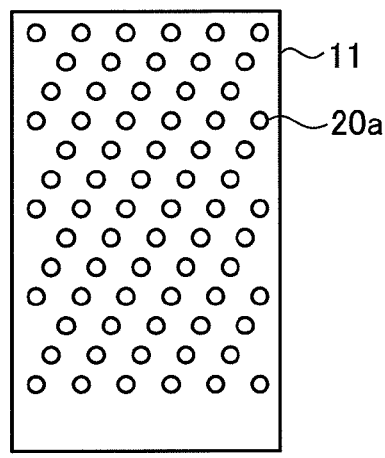
Figures 5, 9:
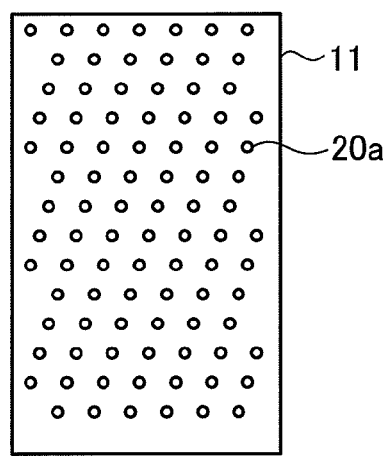
Figures 6, 9:
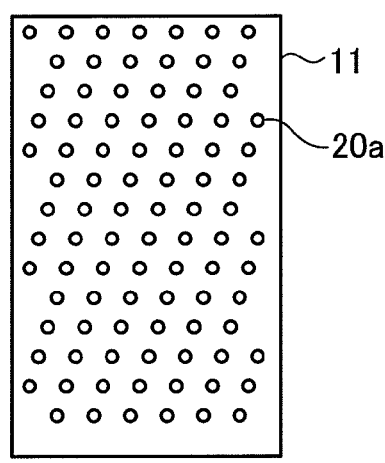
Figures 7, 9:
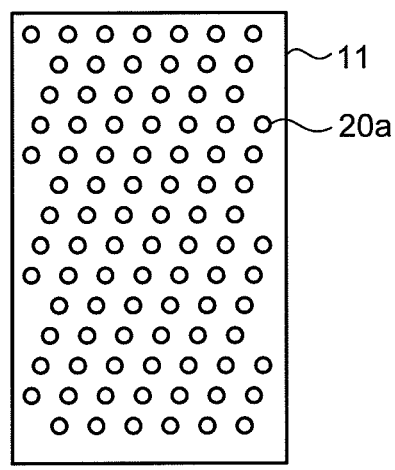
Figures 8, 9:
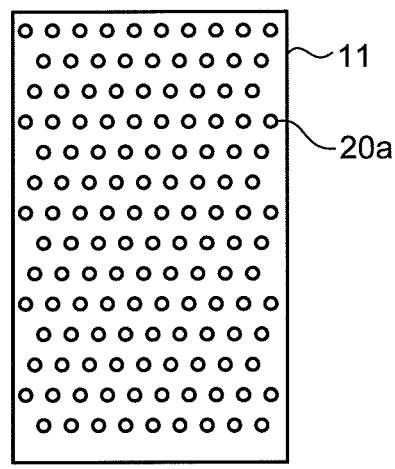

FIGS. 9-1 to 9-8 are examples in which the pore groups are provided in the zigzag arrangement on the substrate.

FIG. 9-1 is a schematic diagram of a substrate in which 80 pores (pore diameter of 5 mm) that form a pore group are disposed in a two-line zigzag arrangement according to the example. FIG. 9-2 is a schematic diagram of the substrate in which pores (pore diameter of 5 mm) that form a pore group are disposed in a three-line zigzag arrangement according to the example. FIG. 9-3 is a schematic diagram of the substrate in which 104 pores (pore diameter of 5 mm) that form a pore group are disposed in a two-line zigzag according to the example. FIG. 9-4 is a schematic diagram of the substrate in which pores (pore diameter of 5 mm) that forms a pore group are disposed in a three-line zigzag arrangement according to the example. FIG. 9-5 is a schematic diagram of the substrate in which pores (pore diameter of 3 mm) that form a pore group are disposed in a four-line zigzag arrangement according to the comparative example. FIG. 9-6 is a schematic diagram of the substrate in which pores (pore diameter of 4 mm) that form a pore group are disposed in a four-line zigzag arrangement according to the comparative example. FIG. 9-7 is a schematic diagram of the substrate in which pores (pore diameter of 5 mm) that form a pore group are disposed in four-line zigzag arrangement according to the example. FIG. 9-8 is a schematic diagram of the substrate in which pores (pore diameter of 4 mm) that form a pore group are disposed in three-line zigzag arrangement according to the example.

Table 1 represents the zigzag arrangements and the pore diameter, a pitch ($P_1$, $P_2$), and the number of pores.

TABLE 1

| | Arrangement | Pore Diameter | $P_1$ | $P_2$ | The number of Pores | Drawings |
|---|---|---|---|---|---|---|
| (1) | Two-line zigzag arrangement | ϕ5 | 13 | 5 | 80 | FIG. 9-1 |
| (2) | Three-line zigzag arrangement | ϕ5 | 13 | 5 | 54 | FIG. 9-2 |
| (3) | Two-line zigzag arrangement | ϕ5 | 10 | 5 | 104 | FIG. 9-3 |
| (4) | Three-line zigzag arrangement | ϕ5 | 10 | 5 | 70 | FIG. 9-4 |
| (5) | Four-line zigzag arrangement | ϕ3 | 10 | 3 | 91 | FIG. 9-5 |
| (6) | Four-line zigzag arrangement | ϕ4 | 10 | 3 | 91 | FIG. 9-6 |
| (7) | Four-line zigzag arrangement | ϕ5 | 10 | 3 | 91 | FIG. 9-7 |
| (8) | Three-line zigzag arrangement | ϕ4 | 10 | 3 | 131 | FIG. 9-8 |

Figure 10:
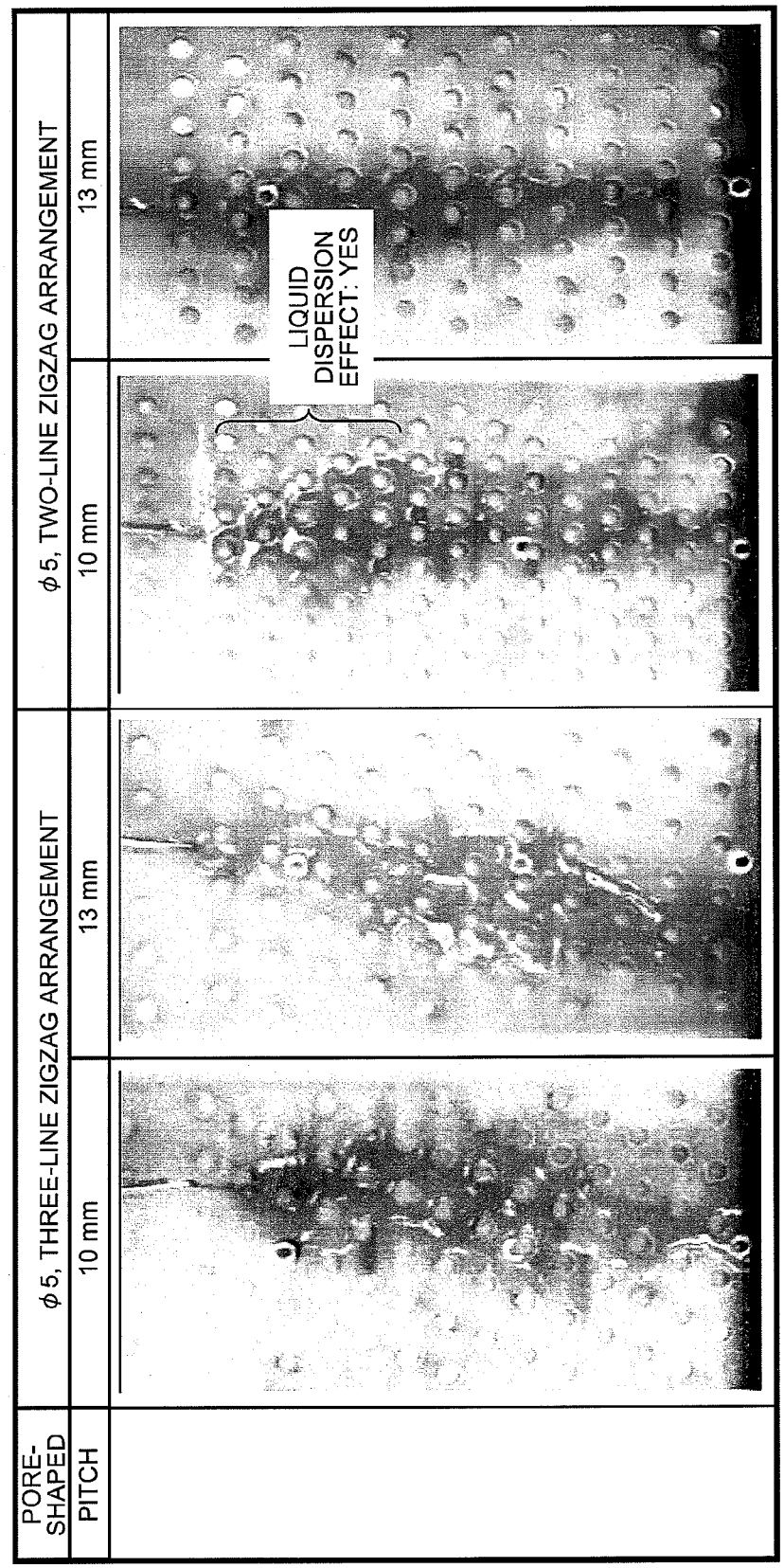
FIG. 10 is a picture of evaluation results in wettability of the substrate according to a test example.
Figure 11:
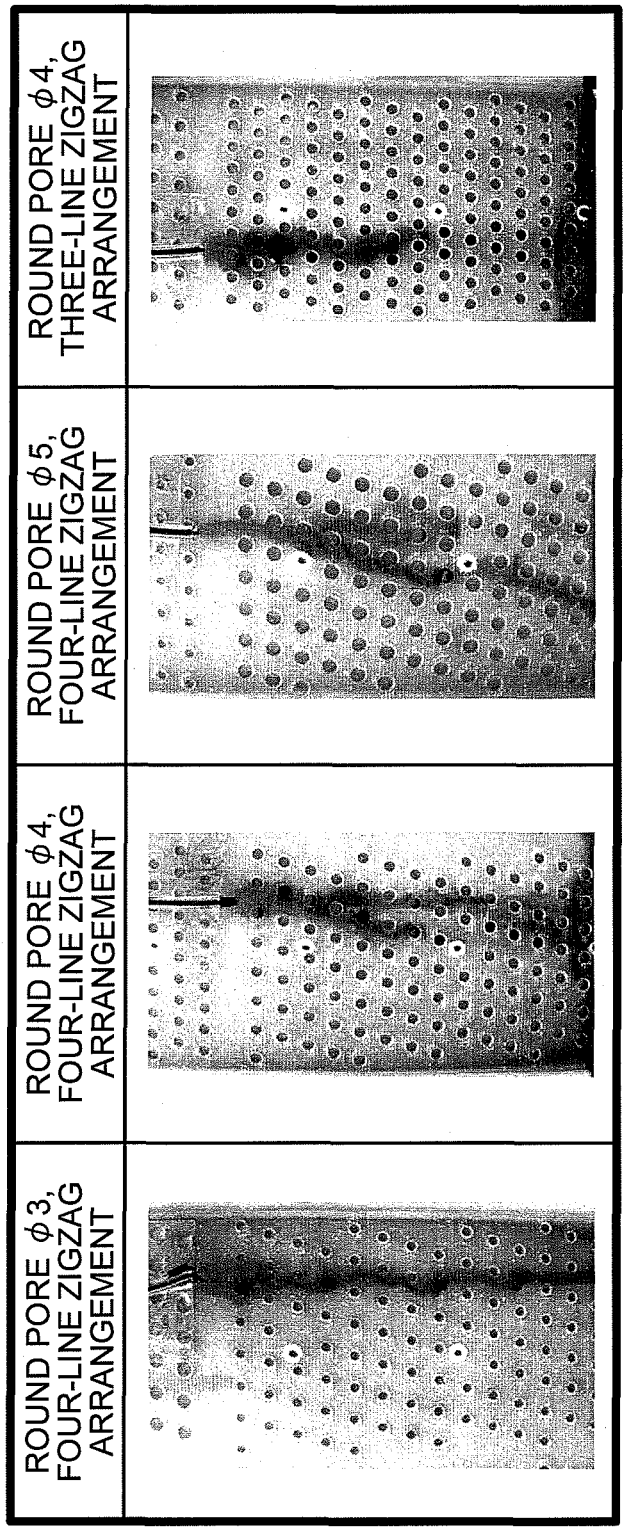
FIG. 11 is a picture of evaluation results in wettability of the substrate according to the test examples.

FIGS. 10 and 11 are pictures of evaluation results in wettability of the substrate according to the test examples. In addition, in the present test examples, a liquid amount of the treatment liquid is 10 cc/minute and the treatment liquid flows from one position.

As illustrated in FIG. 10, in both the three-line zigzag arrangement and the two-line zigzag arrangement, a liquid dispersion effect is excellent.

Further, as illustrated in FIG. 11, while the liquid dispersion effect is poor in the four-line zigzag arrangement having the pore diameter of 3 mm and the four-line zigzag arrangement having the pore diameter of 4 mm, the liquid dispersion effect is favorable in the four-line zigzag arrangement having the pore diameter of 5 mm and the three-line zigzag arrangement having the pore diameter of 4 mm.

In addition, the surface of the substrate 11 is preferably a hydrophilic structure.

When a resin is used as the material constituting the substrate, since hydrophilicity is low, wettability is decreased. Therefore, the surface of the substrate 11 has a hydrophilic structure to obtain the excellent wettability.

The structure may be, for example, a rough surface structure formed by a known physical treatment such as blast treatment, for example, sandblasting and shot blasting, scratch treatment by using a scratcher or the like, or a structure having a hydrophilic group formed by known chemical treatment such as plasma treatment.

Further, the resin which is a material of the substrate contains a hydrophilic material and may be kneaded into the substrate in advance.

Herein, as a resin material, which is usable as the substrate 11, when $CO_2$ is absorbed, the resin material with alkaline resistance is preferably used, in that an amine-based absorbent and the like are alkaline. Specific examples of the resin material include a polypropylene, an acrylonitrile butadiene styrene, nylon, a vinyl chloride or the like. In particular, the polypropylene has superior alkaline resistance, which is preferably used.

Further, examples of the hydrophilic additive material mixed to the substrate include a fatty acid ester-based compound, a polyether-based compound or the like. Examples of the fatty acid ester-based compound include a glycerin fatty acid ester, a polyglycerin fatty acid ester, a polyoxyethylene sorbitan fatty acid ester, a sucrose fatty acid ester or the like. In addition, examples of the polyether-based compound include a polyoxyethylene alkyl ether, a polyoxyethylene alkyl phenyl ether or the like. An amount of the hydrophilic additive material added to the substrate is preferably about 1 part by weight to 30 parts by weight with respect to 100 parts by weight of the resin.

Figure 12:
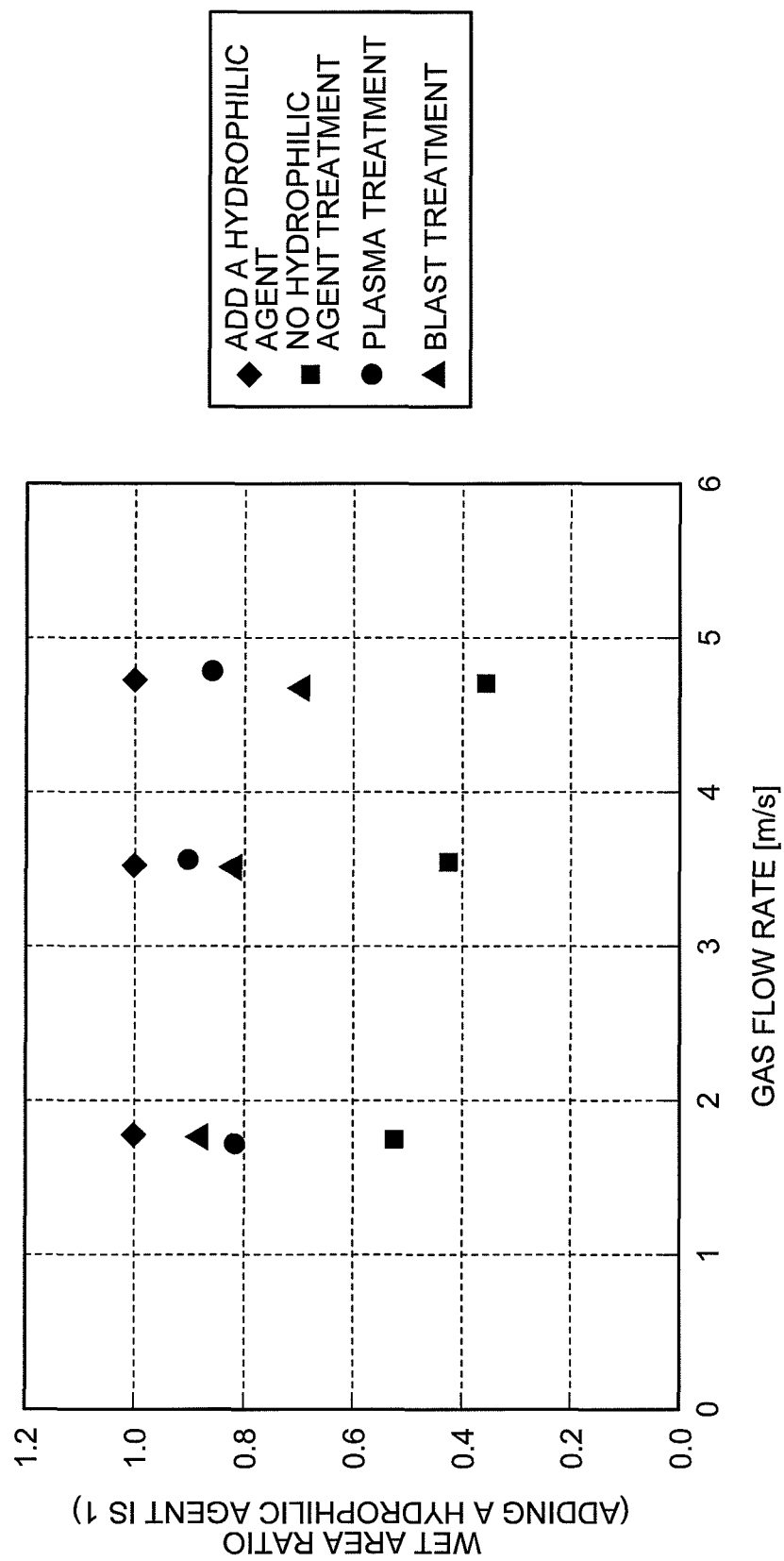
FIG. 12 is a graph illustrating a relationship between a gas flow rate and a wet area ratio depending on a difference of surface treatments of the substrate.

FIG. 12 is a graph illustrating a relationship between a gas flow rate and a wet area ratio depending on the difference of surface treatments of the substrate.

As illustrated in FIG. 12, it is found that, if adding a hydrophilic agent is 1, the blast treatment and the plasma treatment are favorable.

Further, the horizontal grooves 80 may be formed across a surface of the substrate 11 in the direction perpendicular to a vertical axis on the surface of the substrate 11.

FIG. 13 is a diagram illustrating an example in which horizontal grooves are formed on the substrate 11.

As illustrated in FIG. 13, when a thickness of the substrate 11 is 2 mm, a width L of the horizontal groove 80 is preferably 1.0 mm to 0.3 mm. In addition, a length W between the horizontal groove 80 and the adjacent horizontal groove 80 on the surface of the substrate 11 is preferably 0.75 mm to 0.3 mm.

When the horizontal groove is out of the range, wettability is not favorable.

It is confirmed that spreadability of the liquid of the substrate in which the horizontal groove is formed in the pore is more favorable than that of the substrate in which the pores are formed. In addition, a wet area of all the substrate in which the pores are formed is extremely expanded with respect to the general substrate of the related art having no pores and horizontal grooves.

INDUSTRIAL APPLICABILITY

As described above, according to the gas-liquid contacting plate, the gas-liquid contacting laminated block body, the gas-liquid contacting laminated structure and the gas purification device of the present invention, dispersibility of the treatment liquid is improved and thus may be applied to, for example, an absorber that absorbs $CO_2$ in gas.

REFERENCE SIGNS LIST

10 Gas-liquid contacting plate
11 Substrate
12 Treatment liquid
13 Gas
14 Saw teeth-shaped portion

The invention claimed is:

1. A gas-liquid contacting plate made of resin, the gas-liquid contacting plate comprising:
    a substrate for allowing a treatment liquid to flow an upper side to a lower side direction thereof and allowing a part of gas in contact with the treatment liquid to be absorbed into the treatment liquid;
    a liquid dispersion structure subjected to a hydrophilic treatment on a surface of the substrate, for dispersing the treatment liquid on the gas-liquid contacting plate; and
    a liquid delivery structure for making the treatment liquid uniformly flow down from the gas-liquid contacting plate,
    wherein the gas-liquid contacting plate includes a liquid receiving structure for bringing the treatment liquid, which flows down from the upper side, into contact with the gas-liquid contacting plate.

2. The gas-liquid contacting plate according to claim 1, wherein in the liquid delivery structure, a lower end side of the substrate has a downward protruding saw teeth shape having pitches at predetermined gaps, and
    wherein the downward protruding saw teeth-shaped portion is formed of bilaterally symmetric inclined surface portions and a flat portion which is a top surface of inclined surface portions.

3. The gas-liquid contacting plate according to claim 1, wherein the liquid dispersion structure is formed of a plurality of lines of pore groups or protrusion groups at predetermined gaps, and
    wherein an arrangement of the pore groups or the protrusion groups is in a zigzag arrangement.

4. The gas-liquid contacting plate according to claim 3, wherein the liquid receiving structure includes protruding liquid receiving groups arranged at predetermined gaps between the pore groups or the protrusion groups and an upper edge portion of the substrate.

5. The gas-liquid contacting plate according to claim 4, wherein the liquid receiving group is formed of a plurality of cylinders or columns.

6. The gas-liquid contacting plate according to claim 1, wherein the surface of the substrate is a hydrophilic rough surface structure.

7. The gas-liquid contacting plate according to claim 1, wherein the substrate contains a hydrophilic material.

8. A gas-liquid contacting laminated block body, which is a laminated body in which the gas-liquid contacting plate according to claim 1 is laminated in a direction perpendicular to a vertical axis direction.

9. A gas-liquid contacting laminated structure comprising a plurality of lines of the gas-liquid contacting laminated block bodies according to claim 8 which are alternately laminated by a phase of 90 degrees in a vertical axis direction.

10. The gas-liquid contacting laminated structure according to claims 9, wherein a gap between laminated gas-liquid contacting plates which form the gas-liquid contacting laminated block body is the same as a gap between peak portions of downward protruding saw teeth-shaped portion.

11. A gas purification device, comprising:
    a gas purification device main body for circulating a gas;
    the gas-liquid contacting laminated structure according to claim 9 which is disposed inside the gas purification device main body;
    a gas introduction unit for introducing the gas from either of a bottom portion or upper portion of the gas purification device main body;
    a gas discharge unit for discharging the gas from a side different from the gas introduction unit side;
    a treatment liquid supply unit for supplying a treatment liquid from an upper side to the gas-liquid contacting laminated structure; and
    a treatment liquid discharge unit installed in the vicinity of the bottom portion of the gas purification device main body, for discharging the treatment liquid.

* * * * *